US012691805B2

(12) United States Patent
Cohen Gazit

(10) Patent No.: US 12,691,805 B2
(45) Date of Patent: Jul. 28, 2026

(54) RELEASE MECHANISM OF A HEAD RESTRAINT UNIT

(71) Applicant: HEADOVATIONS LTD, Tel Aviv (IL)

(72) Inventor: Ben Cohen Gazit, Tel Aviv (IL)

(73) Assignee: HEADOVATIONS LTD, Tel Aviv (IL)

( * ) Notice: Subject to any disclaimer, the term of this patent is extended or adjusted under 35 U.S.C. 154(b) by 46 days.

(21) Appl. No.: 18/702,770

(22) PCT Filed: Jan. 22, 2023

(86) PCT No.: PCT/IL2023/050067
§ 371 (c)(1),
(2) Date: Apr. 18, 2024

(87) PCT Pub. No.: WO2023/144814
PCT Pub. Date: Aug. 3, 2023

(65) Prior Publication Data
US 2025/0229686 A1      Jul. 17, 2025

(30) Foreign Application Priority Data

Jan. 25, 2022      (IL) .......................................... 290120

(51) Int. Cl.
*B60N 2/888*          (2018.01)
*B60N 2/882*          (2018.01)
(Continued)

(52) U.S. Cl.
CPC .............. *B60N 2/888* (2018.02); *B60N 2/882* (2018.02); *B60N 2/885* (2018.02); *B60R 21/01* (2013.01);
(Continued)

(58) Field of Classification Search
CPC ........ B60N 2/882; B60N 2/885; B60N 2/888; A47C 7/383
See application file for complete search history.

(56) References Cited

U.S. PATENT DOCUMENTS 5,505,523 A * 4/1996 Wang ..................... A47C 7/383
                                                        5/640
9,539,924 B2 * 1/2017 Maassarani ............ B60N 2/885
(Continued)

FOREIGN PATENT DOCUMENTS

GB        2 417 896 A        3/2006
WO        2016/038605 A1        3/2016

*Primary Examiner* — Nicholas McFall
(74) *Attorney, Agent, or Firm* — Maschoff Brennan

(57) ABSTRACT

A head restraint unit is configured to restrain the movement of a head of a user, and to be fixed to or to be integral with a vehicle seat. The head restraint unit includes a headrest member and two side portions extending therefrom. A restraining member is pivotally coupled to the two side portions to allow rotation between a maximal upward position and a maximal downward position. The head of the user is intended to be positioned within the confined space that is formed within the loop defined by the back portion, side portions and the head restraining member. In result to an extreme maneuver of the vehicle, the head of the user can maneuver in a non-safely manner that can damage his/her head or spine. The head restraining member is configured to restrain this extreme movement and to reduce of its risk.

20 Claims, 13 Drawing Sheets

(51) Int. Cl.

| | |
|---|---|
| *B60N 2/885* | (2018.01) |
| *B60R 21/01* | (2006.01) |
| *B60R 22/00* | (2006.01) |
| *B60R 22/32* | (2006.01) |
| *B60R 21/00* | (2006.01) |

(52) U.S. Cl.
CPC .......... *B60R 22/001* (2013.01); *B60R 22/321* (2013.01); *B60R 2021/0048* (2013.01)

(56) References Cited

U.S. PATENT DOCUMENTS

| | | |
|---|---|---|
| 9,566,885 B2 | 2/2017 | Gazit |
| 2002/0067063 A1 | 6/2002 | Taborro |

\* cited by examiner

1410

1408

1470

1408    1474

RELEASE MECHANISM OF A HEAD RESTRAINT UNIT

TECHNOLOGICAL FIELD

The present disclosure is in the field of.

BACKGROUND ART

References considered to be relevant as background to the presently disclosed subject matter are listed below:
WO 2016/038605
Acknowledgement of the above references herein is not to be inferred as meaning that these are in any way relevant to the patentability of the presently disclosed subject matter.

GENERAL DESCRIPTION

The present disclosure provides a head restraint unit that is configured to restrain the movement of a head of a user. The head restraint unit is configured to be fixed to a seat, e.g. a seat of a vehicle, or being integral with a seat. The head restraint unit comprises a headrest member and two side portions extending therefrom. A restraining member is pivotally coupled to the two side portions to allow it to rotate between a maximal upward position and a maximal downward position. The head of the user is intended to be positioned within the confined space that is formed within the loop defined by the back portion, side portions and the head restraining member. The loop defines a loop directionality, namely a direction along the path defined by the back portion, side portions and the head restraining member.

It is to be noted that the loop is not necessarily closed loop. For example, there can be a gap between two parts of the head restraining member, but the gap is not sufficient for allowing a user's head to pass therethrough.

Along the range of rotational positions of the head restraining member, a portion of it defines a head restraining, in which the head restraining member is positioned such that it is intended to engage with the forehead of a user to restrain its movement. In result to an extreme maneuver of the vehicle, the head of the user can maneuver in a non-safely manner that can damage his/her head or spine. The head restraining member is configured to restrain this extreme movement and to reduce of its risk. In cases where the extreme maneuver is too great, the application of a great high restraining force may cause a severe damage to the spine of the user. Thus, the head restraint unit comprises a loop breaking mechanism that is configured to break the loop upon application of a force that exceeds a selected threshold to thereby allow the head of the user to move freely after being restrained for a short duration. This configuration causes that the head of the user is restrained to some degree and reduces the potential impact due to the extreme maneuver, and after this short duration of restraining (which can be several tenth of milliseconds) the restraining is seized due to the breakage of the loop and the head continuous to move freely without risking a spine injury in result of a high restraining force. The force to break the loop breaking mechanism can be adjusted according to the weight of the user, the size of its head or any other parameters. The adjustment can be performed in various ways, such as, but not limited to (i) a selection of a most suitable restraining member out of many, each is configured to break the loop at a different extent of application of force; (ii) a retaining mechanism with several states, in each of them the retaining mechanism is configured to retain a portion of the head restraining member and to release it upon an application of different force; (iii) selection of materials for the breaking mechanism and many other optional configurations.

The loop breaking mechanism can be in many forms, such as, but not limited to (i) a retaining mechanism that retains a portion of the head restraining member from moving along the loop directionality and is configured to release it upon application of said exceeding force; (ii) a stiffening mechanism that stiffens the head restraining member in a formation for restraining the head of the user and upon application the formation of the head restraining member is changed and allows a free movement of the head through the loop.

Thus, an aspect of the present disclosure provides two configurations of the head restraint unit. In the first configuration, the head restraint unit comprising a headrest member configured for being fixed to a seat and having a back portion and a first side portion and a second side portion extending therefrom.

It is to be noted that the headrest member can be a continuous structure with no clear distinction between the back portion and the side portions. In another embodiment, the head reset member can be formed by non-integral parts, namely, the back portions and the side portions are not integrally formed.

The back portion is intended to support the back of a skull of a user and the side portion are intended to face the side portions of the skull of the user. The restraining member is formed by one or more parts and is pivotally coupled to said first and second side portions so as to allow rotation between a range of head-restraining positions and a range of standby positions of said one or more parts. These ranges are found within a range of positions between a maximal upward position and maximal downward position.

The head rest member and said one or more parts defining together a head restraining loop. It is to be noted that the head restraining loop can be a closed loop or an open loop with a small gap between the two parts of the head restraining member but the gap is not sufficient for allowing a user's head to pass therethrough. The head restraint unit further comprising a loop breaking mechanism that is configured for breaking the loop open upon exceeding of application of a selected force thereon, e.g. tension force or upon external identification of extreme maneuver that triggers the breakage of the loop breaking mechanism, e.g. by an accelerometer, imaging sensor, etc.

The second configuration of the head restraint unit comprising a headrest member having a back portion and a first side portion and a second side portion extending therefrom. A restraining member is formed by one or more parts and pivotally coupled to said first and second side portions so as to allow rotation between a head-restraining position and a standby position of said one or more parts. The restraining member extends between two ends and defining a restraining member directionality. The directionality is defined by the direction of the path that is formed between one end of the restraining member and the other, opposite end thereof.

The head restraint unit further comprising at least one retaining mechanism characterized by either (i) being formed on one or both of said side portions and configured for retaining one or more portions of the restraining member for preventing its movement along the restraining member directionality, and to perform said pivotally coupling to said first side portion, or (ii) when the restraining member is constituted by a first part that is pivotally coupled to said first side portion and a second part that is pivotally coupled to said second side portion, the retaining mechanism is formed on said first part and is configured for retaining a portion of the second part such that the second part remains in position with respect to the first part. The retaining mechanism is configured for releasing the retained portion upon exceeding of application of a selected releasing force, e.g. a tension force, on said portion or upon external identification of extreme maneuver that triggers the release of the retained portion, e.g. by an accelerometer, imaging sensor, etc. Thus, when the retained portion is released, the head restraint unit is not capable of restraining the head of the user, which is free to move. In other words, the retaining mechanism is configured to controllably release the retained portion when it is pulled by a force above a selected threshold. This is of great importance in case of a great impact, such as on car accident, when the retaining member restrains some of the impact and before the restraining force that is applied on the subject using the head restraint becomes too great to injure the subject, the restraining member is released, and the remaining impact is reduced with respect to the original one.

It is to be noted that any combination of the described embodiments with respect to any aspect of this present disclosure is applicable. In particular, any embodiment that is described below applies for both of the configurations of the head restraint unit and in any combination with other embodiments. In other words, any aspect and configuration of the present disclosure can be defined by any combination of the described embodiments.

In some embodiments of the head restraint unit, the path defined by the back portion, side portions and the head restraining member defines a loop directionality. It is to be noted that the loop directionality can be in either direction of the loop. The head restraint unit further comprising at least one retaining mechanism being configured for (i) retaining one or more portions of said restraining member for preventing its movement along the loop directionality and (ii) releasing said one or more retained portions upon either exceeding of application of a selected releasing tension force on said one or more retained portions to transition to a non-restraining state or actuation of a releasing mechanism thereof.

In some embodiments of the head restraint unit, said loop breaking mechanism is constituted by said retaining mechanism.

In some embodiments of the head restraint unit, said restraining member is formed of two parts, and the retaining mechanism is a spring embedded in each part being configured to transition between a restraining state and a non-restraining state upon said application of a selected releasing force.

In some embodiments of the head restraint unit, said loop breaking mechanism is one or more clipping elements couples coupling one or both of the side portions to the back portion. The one or more f clipping elements couples are configured to decouple upon said application of force.

In some embodiments of the head restraint unit, the retaining mechanism is rotatable and is configured for retaining a portion of the restraining member in a manner allowing said pivotally coupling of the head restraining member to said first side portion.

In some embodiments, the head restraint unit further comprising first and second retaining mechanisms. Each of the retaining mechanisms is configured for retaining a portion of the restraining member for preventing its movement along the restraining member directionality or the loop directionality, and for performing said pivotally coupling to said first and second side portions, respectively. Namely, the retaining mechanisms are rotatable about an axis normal to the plane defined by the side portions.

In some embodiments of the head restraint unit, the retaining mechanism comprises (i) fixation member fixed to said side portion and (ii) a retention member pivotally coupled to said fixation member for allowing said retaining and said rotation.

In some embodiments of the head restraint unit, the restraining member is constituted by a first part that is pivotally coupled to said first side portion and a second part that is pivotally coupled to said second side portion. The retaining mechanism is formed on said first part and is configured for retaining a portion of the second part such that the second part remains in position with respect to the first part. Namely, the retaining mechanism prevents the movement of the second part along the loop directionality or restraining member directionality.

In some embodiments of the head restraint unit, the first part is longer than the second part.

In some embodiments of the head restraint unit, the second part comprises a coupling band formed on external face thereof. The first and second parts have inner faces that is configured to engage the user's head, in particular the forehead, and external faces opposite to said inner faces that face away from the user. The coupling band is configured for being received in said retaining mechanism and being retained therein.

In some embodiments of the head restraint unit, one or more parts are length-adjustable to allow fitting over different sizes of heads. In some embodiments, a portion of the back portion can be adjusted between a first, minimal length, and a second, maximal length. In some embodiments, a portion of any one of the side portions can be adjusted between a first, minimal length, and a second, maximal length. In some embodiments, there can be a combination of the two.

In some embodiments of the head restraint unit, said retaining mechanism is a hook-and-loop fastener, i.e. Velcro fastener.

In some embodiments of the head restraint unit, said retaining mechanism is constituted by seams formation coupling the first part to the second part. The strength of the seams defines the required force to break the loop open and free the head of the user from the restraining of the restraining member.

In some embodiments of the head restraint unit, the retaining mechanism comprises (i) a ratchet mechanism for performing said retaining and (ii) a controllable releasing mechanism for controllably releasing said retained portion upon actuating it. Namely, the retained portion can be controllably released upon actuation of an actuator of the controllable releasing mechanism, e.g. by pressing or pulling a part of the releasing mechanism that cancels the ratchet mechanism.

In some embodiments of the head restraint unit, the retaining mechanism comprises a receiving space for receiving said retained portion of said restraining member. First and second engaging elements are protruding from opposite sides into said receiving space, each is configured to engage an opposite side of the restraining member when it is received in said receiving space.

In some embodiments of the head restraint unit, said first engaging element is fixed and said second engaging element is displaceable, for example, upon actuation of a lever actuator by a user, between maximal engagement position and minimal engagement position with the restraining member, when it is received in the receiving space, thereby defining the restraining intensity of said restraining member. This allows to insert and eject the portion of the head restraining member into and out of the receiving space of the retaining mechanism easily and controllably.

In some embodiments of the head restraint unit, a portion of the first engaging element in said receiving space has a curved, round, or convex shape. These types of shapes allow the restraining member to progress over the engaging element when there is relatively low restraining force that is applied thereon and to restrain it in position when there is relatively high retaining force that is applied thereon, e.g. by the second engaging element.

In some embodiments of the head restraint unit, said retaining mechanism comprises a tooth-engaging element, e.g. a cog of a cogwheel, being configured for engaging with a respective toothed part in said retained portion.

In some embodiments of the head restraint unit, said retaining mechanism comprises releasing force adjusting unit configured for allowing adjustment of said releasing force, e.g. according to the user's age, weight, head size, etc. For example, the releasing force of a user having a relatively high weight may be adjusted to be greater than the releasing force of a user having a lower weight. As mentioned above, the releasing force can be determined by the weight of the user or by his/her age, head size or other relevant parameters. It is to be noted that the adjustment of the releasing force by the releasing force adjusting unit is typically independent to the adjustment of the length of the restraining member or the headrest member. Furthermore, there may be several mechanisms that may be suitable for providing this capability of controlling the releasing force.

In some embodiments of the head restraint unit, the retained portion is snappingly fit in said retaining mechanism to thereby be retained therein.

In some embodiments of the head restraint unit, said retaining mechanism comprises (i) a receiving space for receiving said retained portion of said restraining member and (ii) a fastening element gradually transitionable between a maximal fastening state, in which it applies maximal force on said retained portion when being receive in the receiving space, and a minimal fastening state, in which it applies minimal force on said retained portion when being receive in the receiving space.

In some embodiments of the head restraint unit, said retaining mechanism comprises an electric locking mechanism that is configured to execute a release command to release said retained portion upon either (i) actuating a release actuator or (ii) sensing or receiving execution data indicative of said exceeding of application of a selected releasing force on said portion. The execution data may be received from sensors that are located in the internal space of the vehicle or external thereto that are configured to sense and/or determine acceleration or extreme maneuver of the vehicle that triggers the release command.

In some embodiments of the head restraint unit, said restraining member is a strap or a band. The strap may have two loose ends, each is received in a different retaining mechanism. The lengths of these loose ends define the effective size of the restraining member.

In some embodiments of the head restraint unit, the headrest member comprises a headrest length-adjusting arrangement for adjusting the length of the headrest member. Thus, the headrest member can be configured along a range of sizes to fit various head sizes.

In some embodiments of the head restraint unit, each side portion comprises an end, such as a tab, configured to be received in a receiving portion, such as a pocket, of the back portion. Each end is capable of extraction and retraction from said receiving portion along a range defined between a maximal extraction position and a maximal retraction position and to be selectively arrested or stopped in one or more positions along said range.

In some embodiments of the head restraint unit, the two ends of the side portions are configured to perform a symmetrical movement so as to result in a symmetrical shape of the headrest member. In some other embodiments, each of the ends is free to move independently to the other end.

In some embodiments of the head restraint unit, the headrest member comprises a fixing element for fixing it to a seat.

In some embodiments, the head restraint unit is integral with a seat, e.g. a seat of a vehicle.

Yet another aspect of the present disclosure provides a seat comprising a head restraint unit according to any one of the above-described embodiments or any combination thereof.

Yet another aspect of the present disclosure provides a head restraint unit. The head restraint unit comprising a headrest member having a back portion and first and second side portions extending therefrom. The first and second side portions are reversibly transitionable between a forehead restraining state, in which the two side portions are flexed to be touch or being in a close association with each other and separated by a small gap, and a non-forehead restraining state, in which the two side portions are separated from each other such that they leave enough space for the head of the subject to pass. The transition between the forehead restraining state and the non-forehead restraining state requires a selected amount of force to be applied on one or both of the side portions.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a perspective view and FIG. 1B is an exploded view.

FIG. 2A is a perspective view; FIG. 2B is an exploded view; and FIG. 2C is an isolated side view of the retaining mechanism.

FIG. 3A shows two side views of the head restraint unit in use of a user, one when the restraining member is coupled to the headrest member and one when the restraining member is decoupled from the headrest member; FIG. 3B shows four perspective views of the retaining mechanism in different state of association between it and the head restraining member.

FIG. 4A shows two side views of the head restraint unit in use of a user, one when the restraining member is coupled to the headrest member and one when the restraining member is decoupled from the headrest member; FIG. 4B shows four perspective views of the retaining mechanism in different state of association between it and the head restraining member.

FIG. 5 shows two side views, one when the restraining member is coupled to the headrest member and one when the restraining member is decoupled from the headrest member.

FIG. 6 shows two side views, one when the restraining member is coupled to the headrest member and one when the restraining member is decoupled from the headrest member. Furthermore, the figure shows a perspective view of the retaining mechanism and optional lengths for the head restraining member.

FIG. 7 shows two side views of the head restraint unit in use of a user, one when the restraining member is coupled to the headrest member and one when the restraining member is decoupled from the headrest member. Furthermore, FIG. 7 shows two side views of the ratchet mechanism of the retaining mechanism in two states.

FIG. 8 shows two side views of the head restraint unit in use of a user, one when the restraining member is coupled to the headrest member and one when the restraining member is decoupled from the headrest member. Furthermore, FIG. 8 shows two side views of the ratchet mechanism of the retaining mechanism in two states.

FIG. 9 shows two side views and two top views of the head restraint unit in use of a user, one of each when the restraining member is coupled to the headrest member and one of each when the restraining member is decoupled from the headrest member. Furthermore, FIG. 9 shows a front view of the head restraint unit in use of a user.

FIG. 10 shows two side views and two top views of the head restraint unit in use of a user, one of each when the restraining member is coupled to the headrest member and one of each when the restraining member is decoupled from the headrest member. Furthermore, FIG. 10 shows a front view of the head restraint unit in use of a user.

FIG. 11 shows two side views of the head restraint unit in use of a user, one when the side portions are in a forehead restraining state and one when the side portions are in a non-forehead restraining state. Furthermore, FIG. 11 shows a top view of the head restraint unit in use of a user.

FIG. 12 shows two side views of the head restraint unit in use of a user and two top views of the head restraint unit in use of a user, one of each when the side portions are in a forehead restraining state and one of each when the side portions are in a non-forehead restraining state. Furthermore, FIG. 12 shows a top view of the head restraint unit in use of a user.

FIG. 14A shows the releasing force adjusting unit where the restraining member is outside it and not received inside the unit; FIG. 14B shows the releasing force adjusting unit where the restraining member is received within the unit at a desired degree defining the effective length of the restraining member but in a neutral state; FIG. 14C shows the releasing force adjusting unit where the restraining member is received within the unit at a desired degree and is restrained in a desired force defining the release force.

DETAILED DESCRIPTION

The following figures are provided to exemplify embodiments and realization of the invention of the present disclosure.

Figures 1A, 1B:
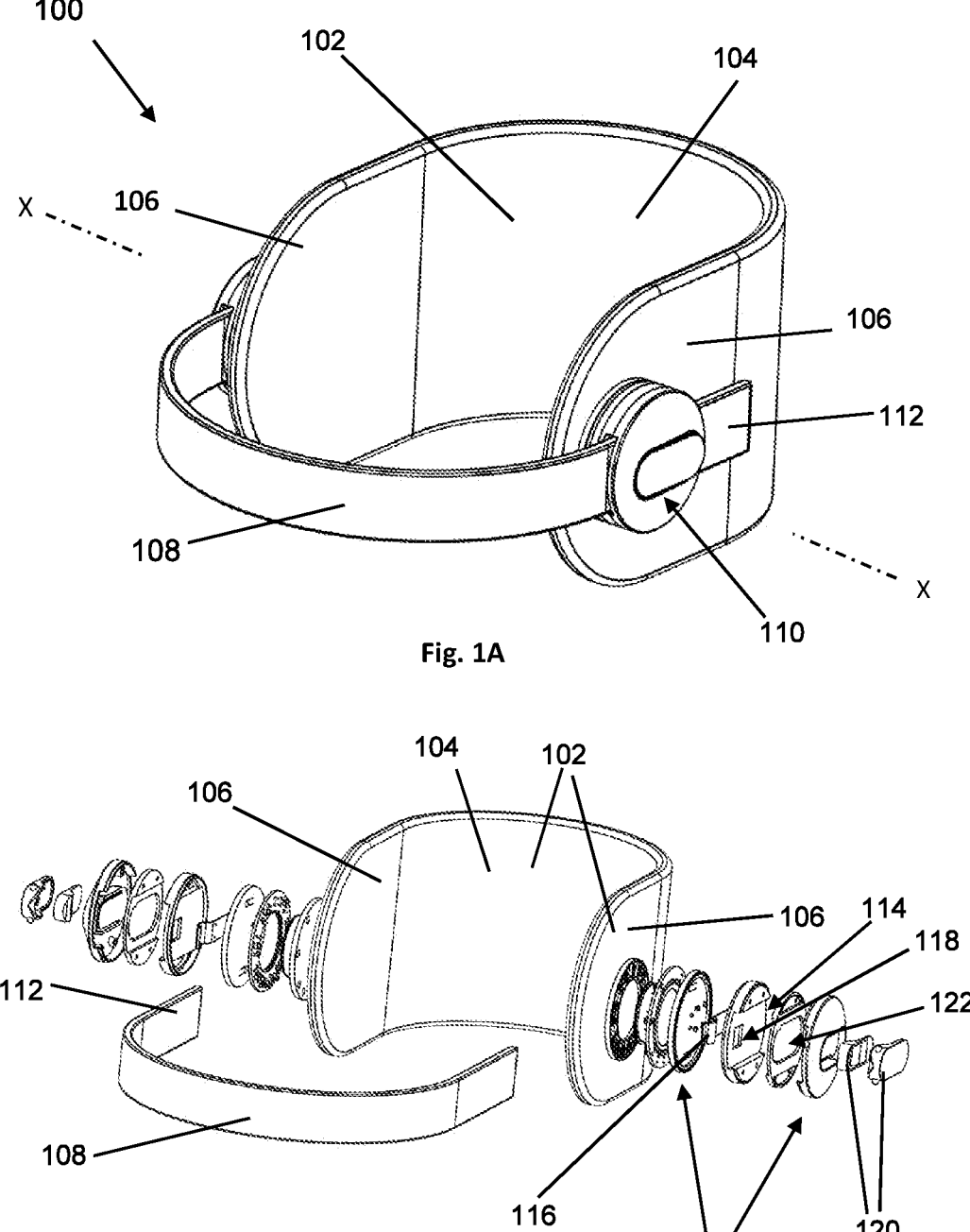
FIGS. 1A-1B are schematic illustrations of a non-limiting example of embodiment of the head restraint unit of the present disclosure.

Reference is first being made to FIGS. 1A-1B, which are schematic illustrations of different views of a non-limiting example of embodiment of the head restraint unit of the present disclosure. The head restraint unit 100 comprises a headrest member 102 having a back portion 104 and two side portions 106 extending therefrom. A head restraining member 108 is pivotally couplable to each of the side portions 106 thereby allowing rotational movement thereof along a range of rotational positions. A range of these rotational positions defines a head restraining state and another range defines a standby, non-head restraining state. Typically, the range defining the standby state is when the head restraining member is at an upward position and the range defining the head-restraining state is when the head restraining member is at a more downward position. The back portion 104, the side portions 106 and the head restraining member 108 are forming a closed loop together to allow the restraining of head movement of a user. The closed loop is breakable upon application of tension force between the headrest member and the restraining member that exceeds a selected threshold, as detailed below. The pivotally coupling is made via retaining mechanisms 110 that are formed on each side portion 106. Each retaining mechanism 110 is configured to receive an end portion 112 of the restraining member 108 and retain it in a desired position such that it cannot move. Each retaining mechanism 110 is further configured to rotate about an axis X passing through both of the retaining mechanisms 110 and being substantially normal to planes defined by the side portions to allow the rotational movement of the restraining member 108.

The restraining member 108 is a strap and it has an effective length that can be adjusted by inserting a desired length of the end portion 112 of the restraining member 108 to each of the retaining mechanisms 110. By controlling the effective length, the restraining member 108 can be adjusted for different head sizes, e.g. for users of different ages.

The retaining mechanism 110 comprises a receiving space 114 configured for receiving the end portion 112 of the restraining member 108, as can be seen in FIG. 1B, which is an exploded view of the head restraint unit. The restraining member 108 is retained in the receiving space 114 by being sandwiching between a protruding element 116 that protrudes through a first aperture 118 into the receiving space 114 and a lever element 120 that protrudes through a second aperture 122 into the receiving space 114 from an opposite side of the first aperture 118. The lever element 120 is configured to be pressable thereby allowing its withdrawal from the receiving space 114 to remove the sandwiching effect and allowing the restraining member 108 to move freely in the receiving space 114. When the lever element 120 is not pressed, its presence in the receiving space 114 resist the movement of the restraining member 108 causing its retention in position. The sandwiching force applied by the two protruding elements defines the force required for releasing the restraining member in a case of a car accident or an extreme maneuver of the vehicle in which the head restraint unit is used. When such a force is applied between the restraining member and the headrest member, the restraining member is released from the coupling to the headrest member.

In the figures throughout the application, like elements of different figures were given similar reference numerals shifted by the number of hundreds corresponding to the number of the respective figure. For example, element 202 in FIGS. 2A-2C serves the same function as element 102 in FIGS. 1A-1B.

Figure 2A:
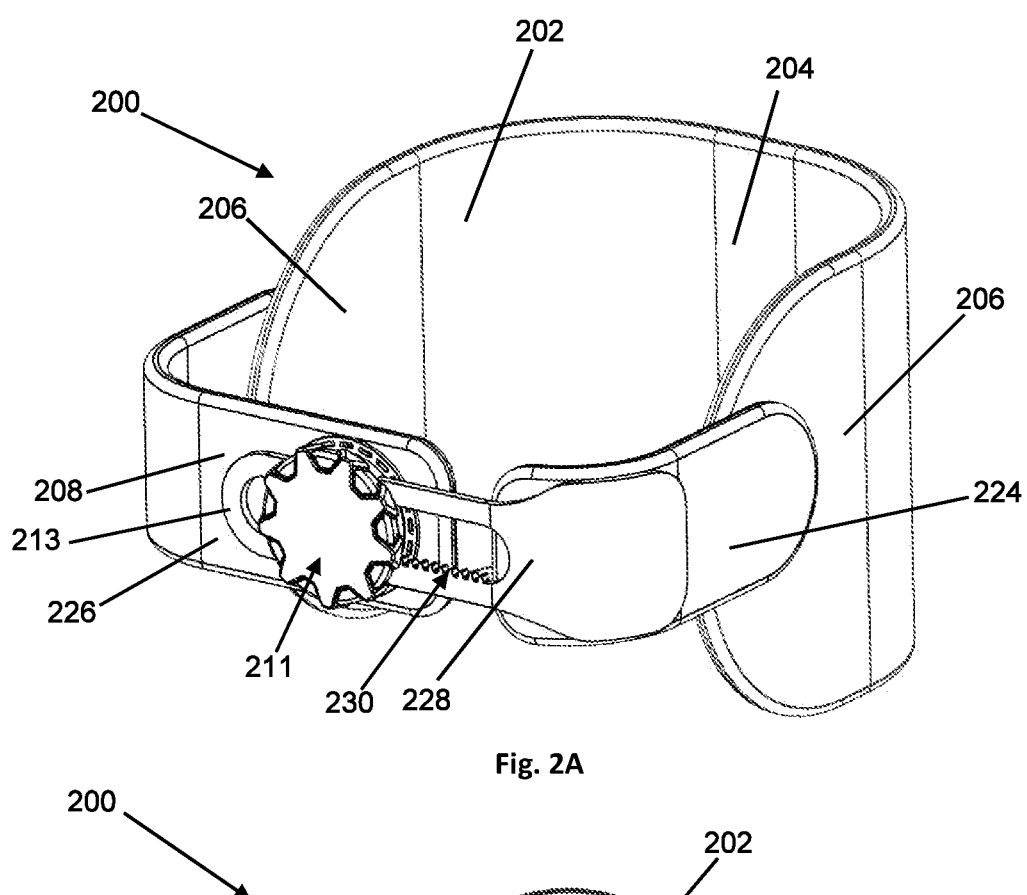
FIG. 2A-2C are schematic illustrations of a non-limiting example of an embodiment of the head restraint unit.
Figure 2B:
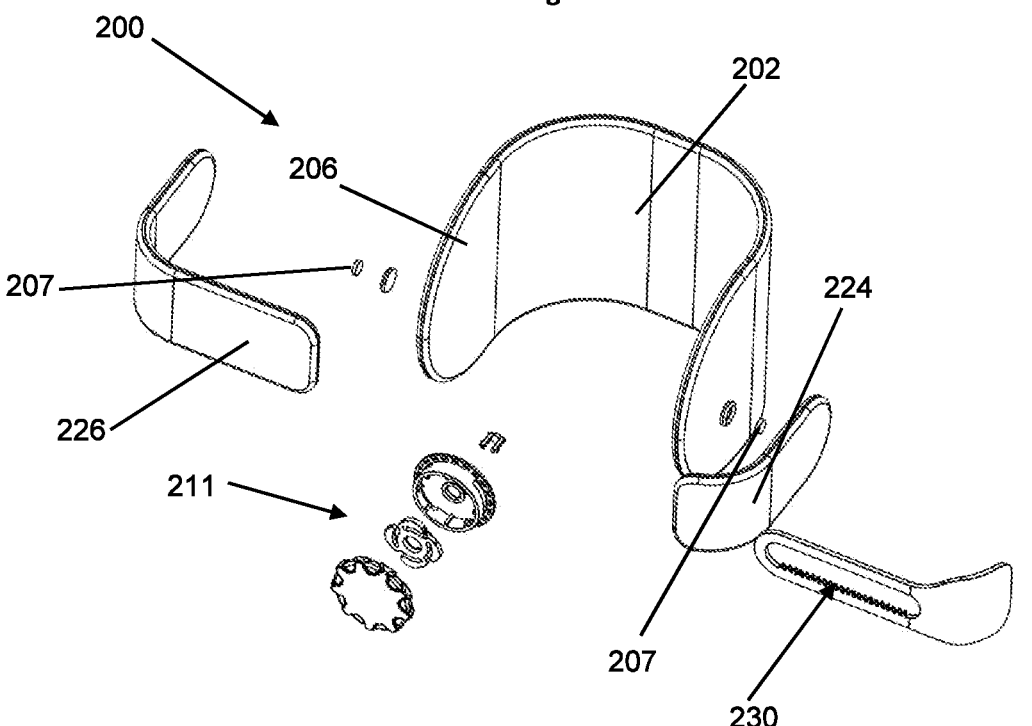
Figure 2C:
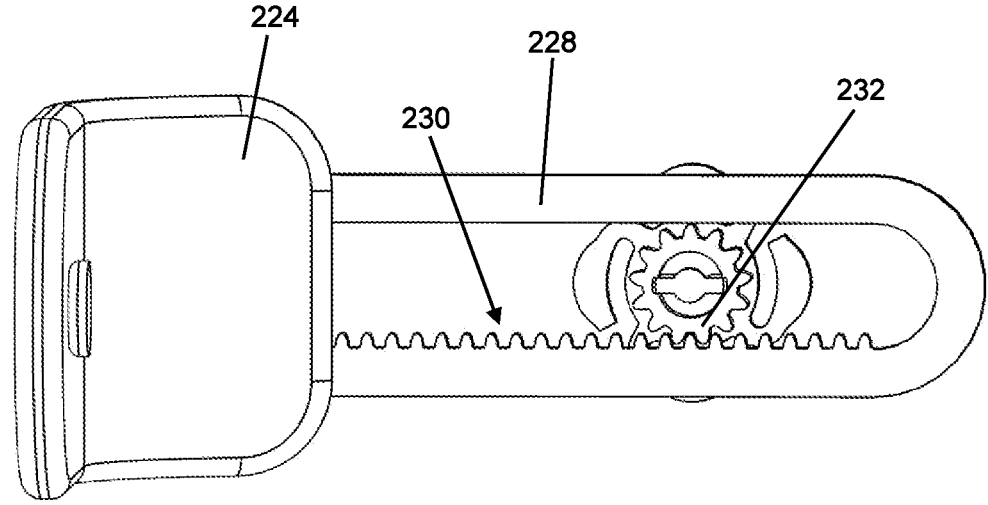

Reference is now being made to FIGS. 2A-2C, which are schematic illustrations of different views of a non-limiting example of an embodiment of the head restraint unit. The head restraint unit 200 comprises a headrest member 202 having a back portion 204 and two side portions 206 extending therefrom. A head restraining member 208 is pivotally couplable to each of the side portions 206 via rotatable clips 207, each being coupled to respective clip-receiving member 209, thereby allowing rotational movement thereof along a range of rotational positions. The head restraining member 208 is formed by a first part 224 and a second part 226, each is pivotally coupled to a different side portion. The first part 224 comprises a coupling band 228 extending therefrom and being configured to be received in a length-adjusting mechanism 211 of the head restraining member 208 that is formed on the second part 226. The coupling band 228 comprises toothed portion 230 and the length-adjusting mechanism 211 comprises a tooth-engaging element 232, such as a cogwheel, that is configured for engaging with the toothed portion 230 in a ratchet-like engagement mechanism, as can be seen if FIGS. 2B-2C. The rotatable clips 207 constitute the retaining mechanism 210 and are configured to decouple from their clip-receiving members 209 upon application of a tension force on any part of the head restraining member that exceeds a certain threshold, to allow the head of the user to move freely after a short duration of application of restraining force by the restraining member on the head of the user.

Another alternative for the realization of the retaining mechanism can be by maintaining the distal end 213 of the coupling band 228 open (not shown in FIGS. 2A-2C), and the length-adjusting mechanism 211 is configured to release the coupling band 228 upon application of a tension force on the coupling band that exceeds a selected threshold such that the coupling band 228 can slide and decouple from the length-adjusting mechanism 211 and open the loop.

FIGS. 3-10 are schematic illustrations of different non-limiting examples of retaining mechanisms of the head restraint unit of the present disclosure.

Figure 3A:
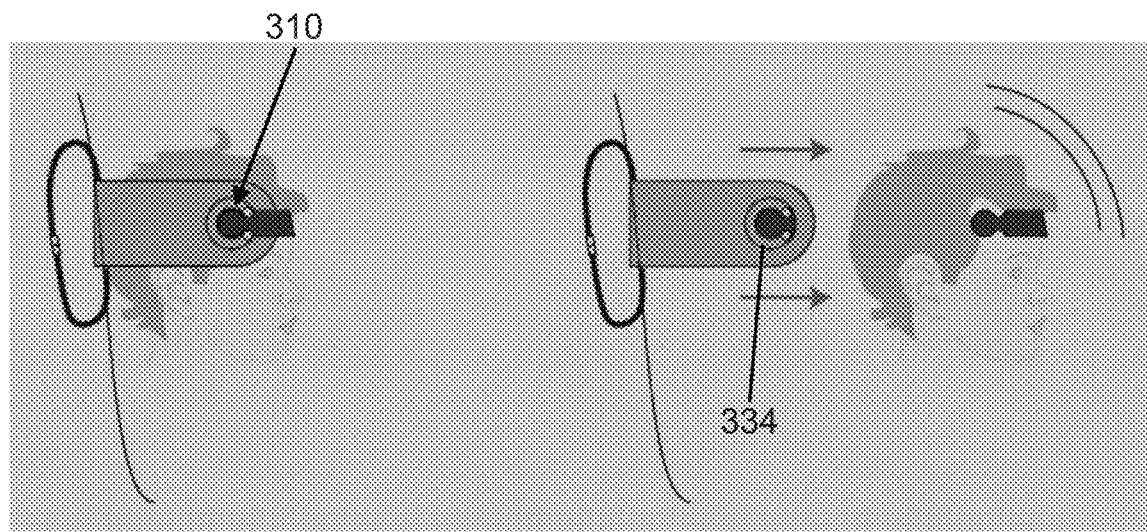
FIGS. 3A-3B are schematic illustrations exemplifying a non-limiting realization of the retaining mechanism.
Figure 3B:
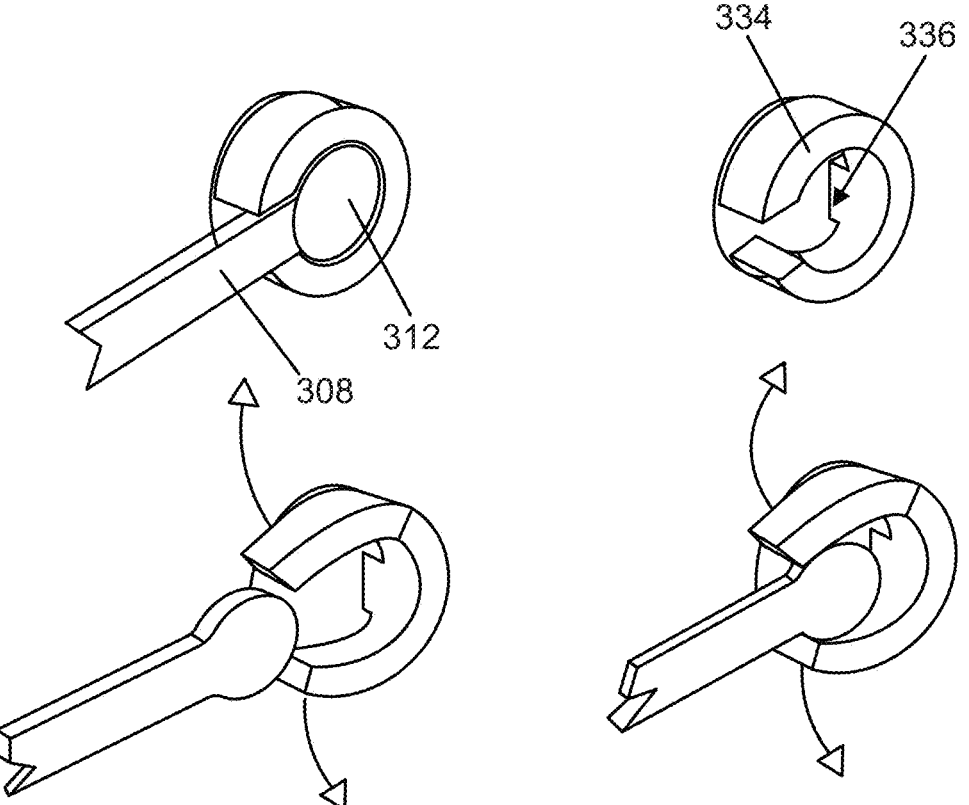

Reference is now being made to FIGS. 3A-3B. In this example, the retaining mechanisms 310 in each side portion are formed of anchoring elements 334 having anchoring spaces 336 designed for receiving a respective end portion of the head restraining member 308. The end portions 312 are designed in a shape fitting to the anchoring spaces 336 when inserted therein from the side but is restricted from being released from the anchoring space when being pulled along a direction defined by the path formed between the two ends of the restraining member 308.

Figure 4A:
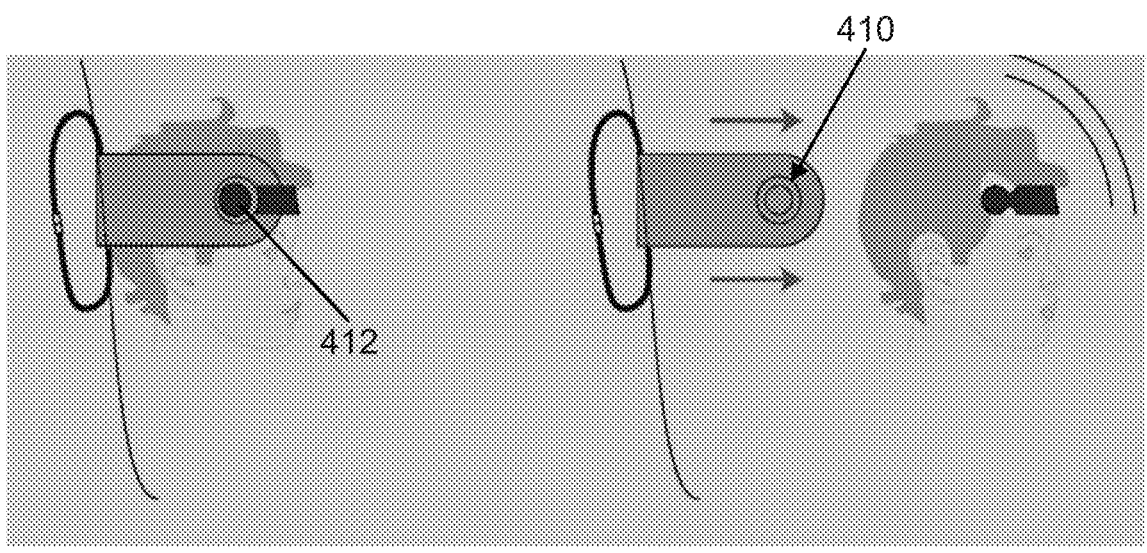
FIGS. 4A-4B are schematic illustrations exemplifying a non-limiting realization of the retaining mechanism.
Figure 4B:
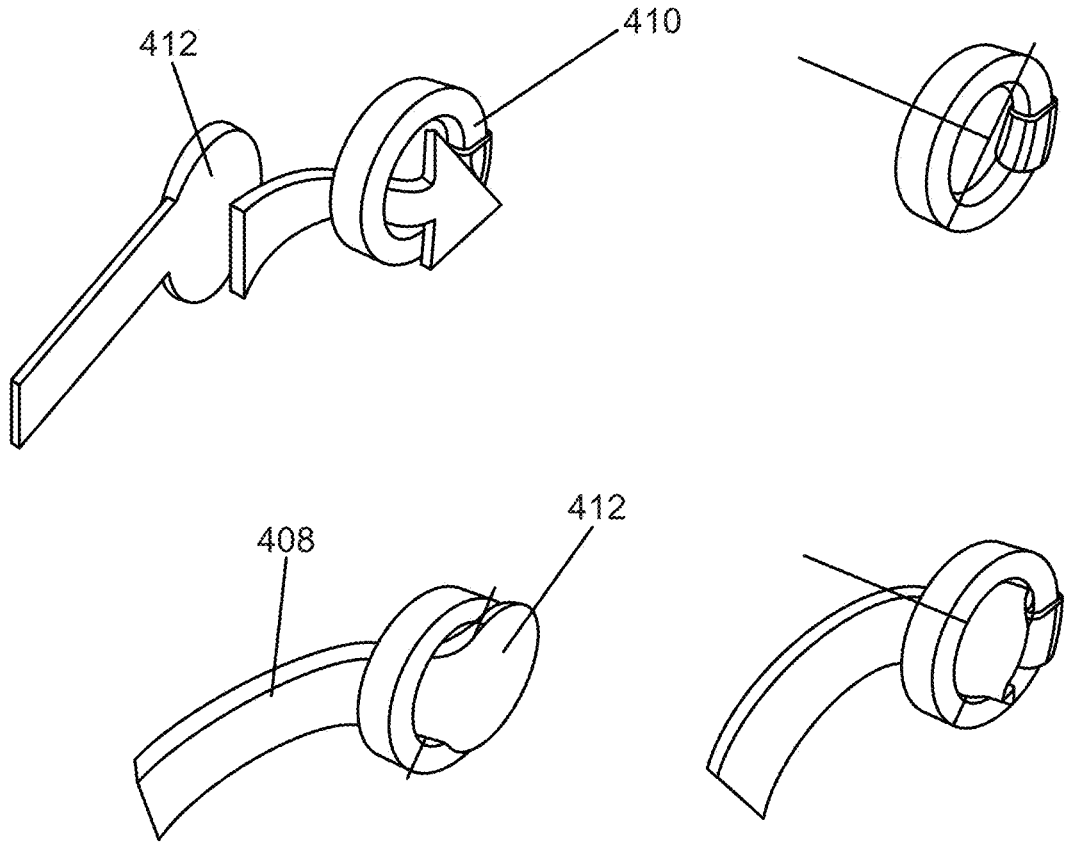

FIGS. 4A-4B show a retaining mechanism 410 that is a circular hollowed element being configured to receive therethrough each end portion 412 of the head restraining member 408. The end portion 412 is intended to be inserted through the circular hollowed element 410 by deformation thereof during the insertion. Thus, when it is received in the hollowed element 410 it is restricted from pulling out of it and it is being released only by application of tension force above a certain threshold.

Figure 5:
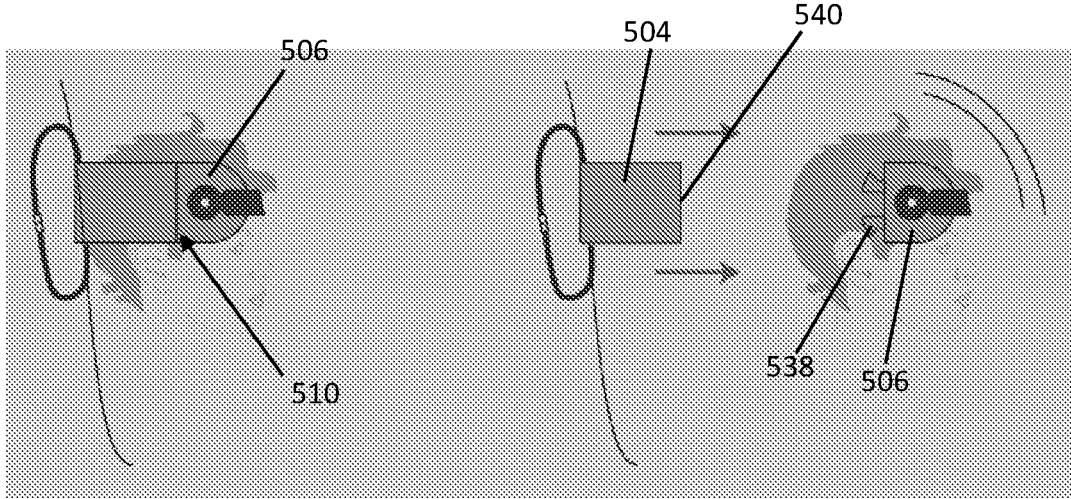
FIG. 5 is a schematic illustration exemplifying a non-limiting realization of the retaining mechanism.

FIG. 5 shows a retaining mechanism 510 that is formed between the side portion 506 and the back portion 504. The retaining mechanism 510 is constituted by two clipping members that configured for coupling with each other, a first clipping member 538 formed on the side portion 506 and the second clipping member 540 formed on the back portion. Upon application of a tension force exceeding a certain threshold between the back portion 504 and the side portion 506, the two clipping members are configured to be decoupled.

Figure 6:
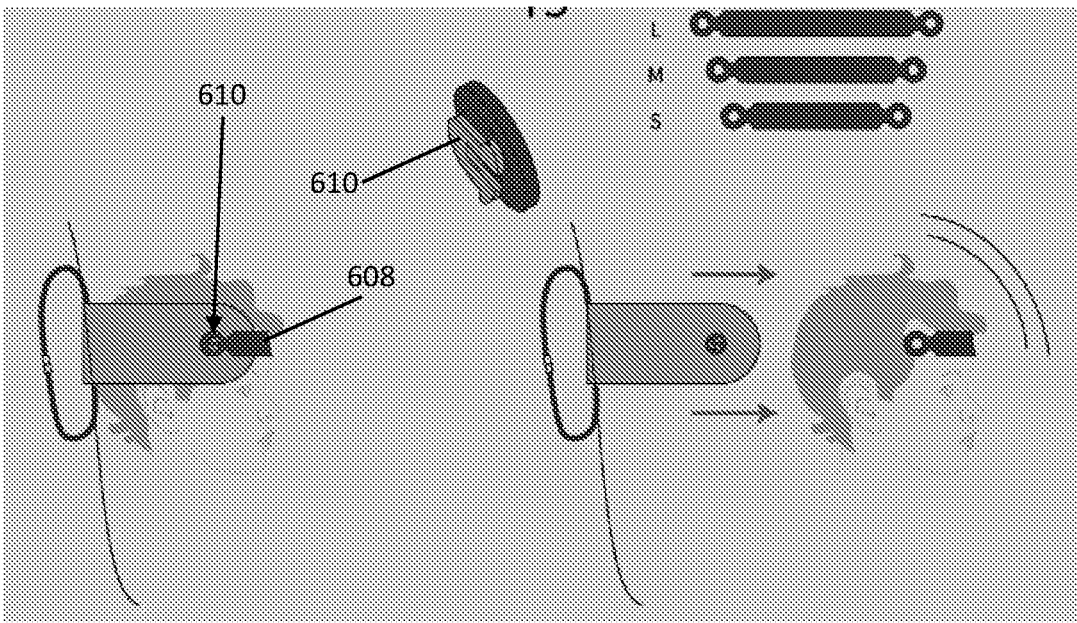
FIG. 6 is a schematic illustration exemplifying a non-limiting realization of the retaining mechanism.

FIG. 6 shows a retaining mechanism 610 in the form of a protruding element and the end portion 612 of the head restraining member 608 is designed to fit over the protruding element 610 so as to anchor thereon. The protruding element 610 is configured to deform upon application of a tension force exceeding a certain threshold on the restraining member 608 such that it allows the restraining member 608 to be released from its retention.

Figure 7:
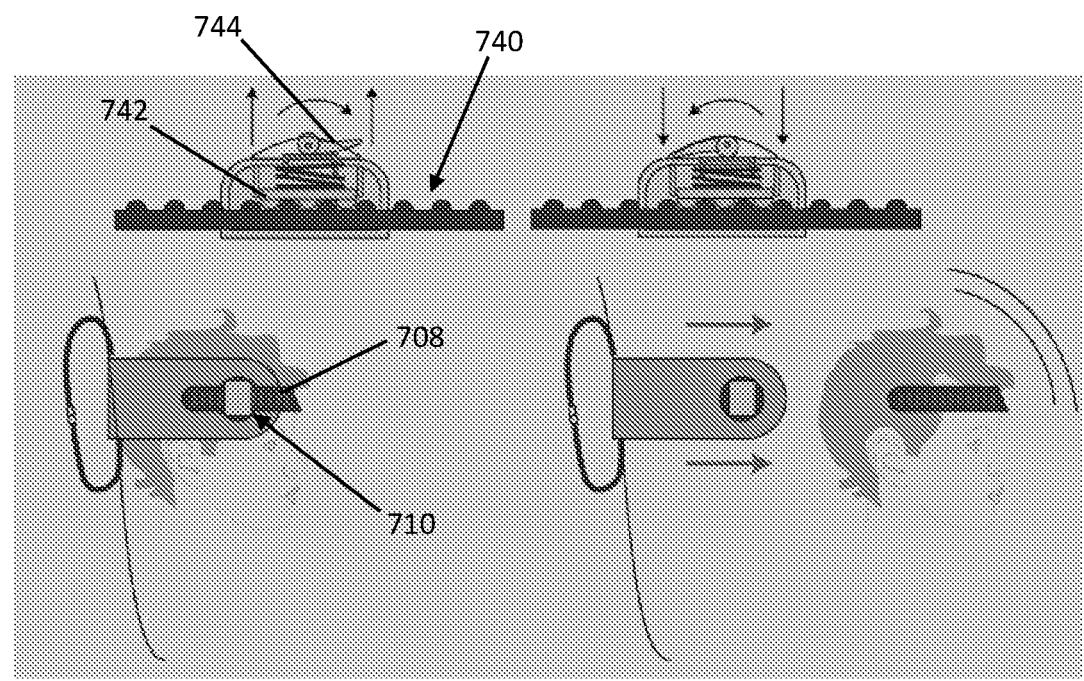
FIG. 7 is a schematic illustration exemplifying a non-limiting realization of the retaining mechanism.
Figure 8:
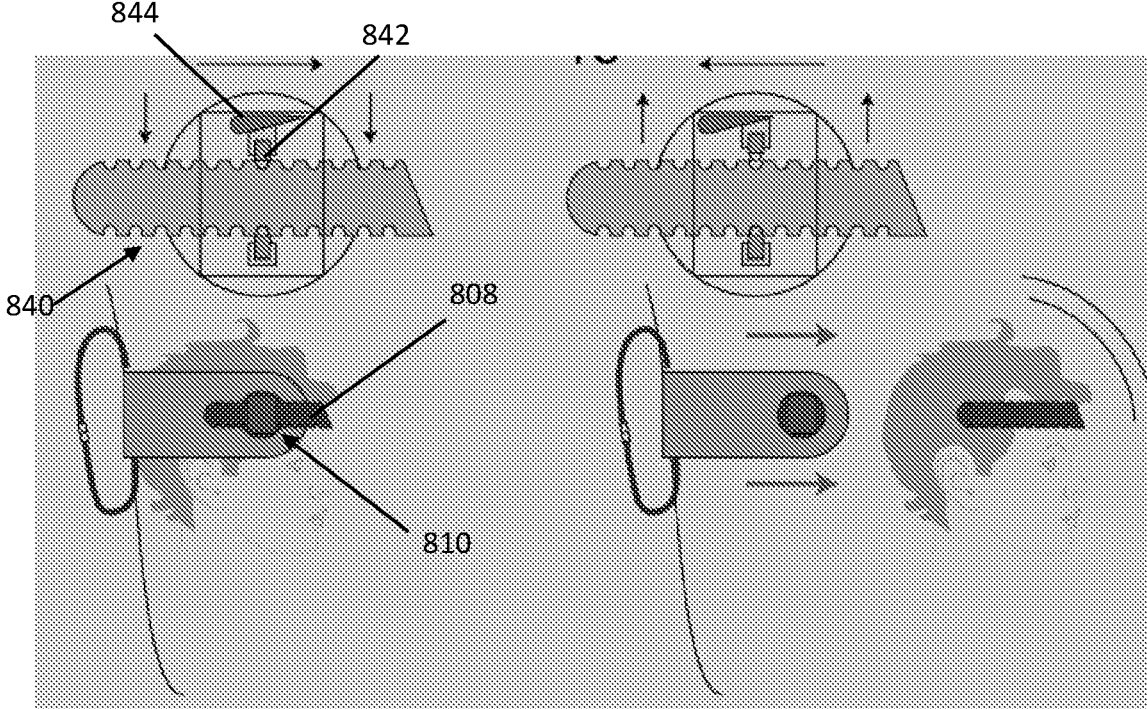
FIG. 8 is a schematic illustration exemplifying a non-limiting realization of the retaining mechanism.

FIGS. 7-8 are two examples of a retaining mechanism 710/810 in the form of a ratchet mechanism. In each example the head restraining member 708/808 comprises a toothed portion 740/840 that is configured to be engaged with a tooth-engaging element 742/842. The tooth-engaging element 742/842 can switch between two states by an actuation of a switch element 744/844, a first, non-retaining state, in which it is not pressed by the switch element 744/844 towards the toothed portion and thus allowing the restraining member 708/808 to move relatively freely through the ratchet mechanism 710/810; and a second, retaining state, in which it is pressed by the switch element 744/844 towards the toothed portion and allowing only one direction of movement of the head restraining member 708/808 through the ratchet mechanism 710/810 that results in tightening of the head restraining member 708/808 over the user's head. Upon application of a tension force exceeding a certain threshold on the restraining member 708/808, the ratchet mechanism 710/810 is configured to release the restraining member 708/808.

Figure 9:
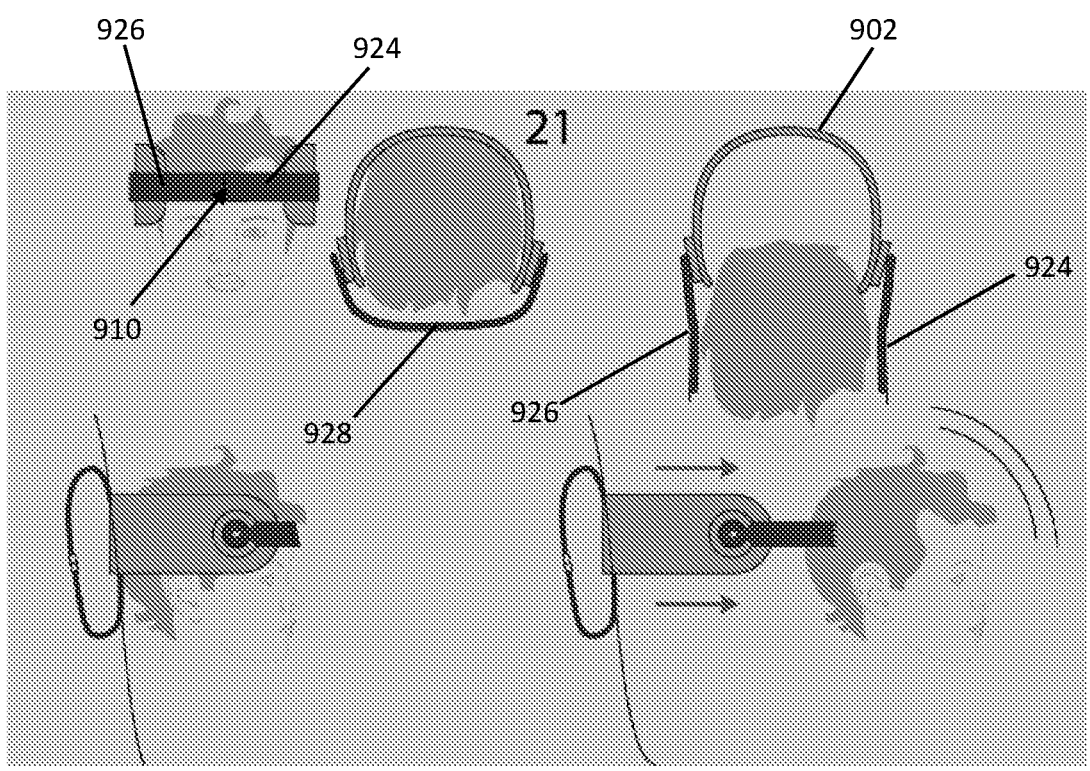
FIG. 9 is a schematic illustration exemplifying a non-limiting realization of the loop breaking mechanism.

FIG. 9 shows a retraining mechanism 910 in the form of seams between a first part 924 and a second part 926 of the head restraining member 908. The two parts are seamed together by a seam that defines the required force to tear it and to break the loop formed by the headrest member 902 and the head restraining member 928.

Figure 10:
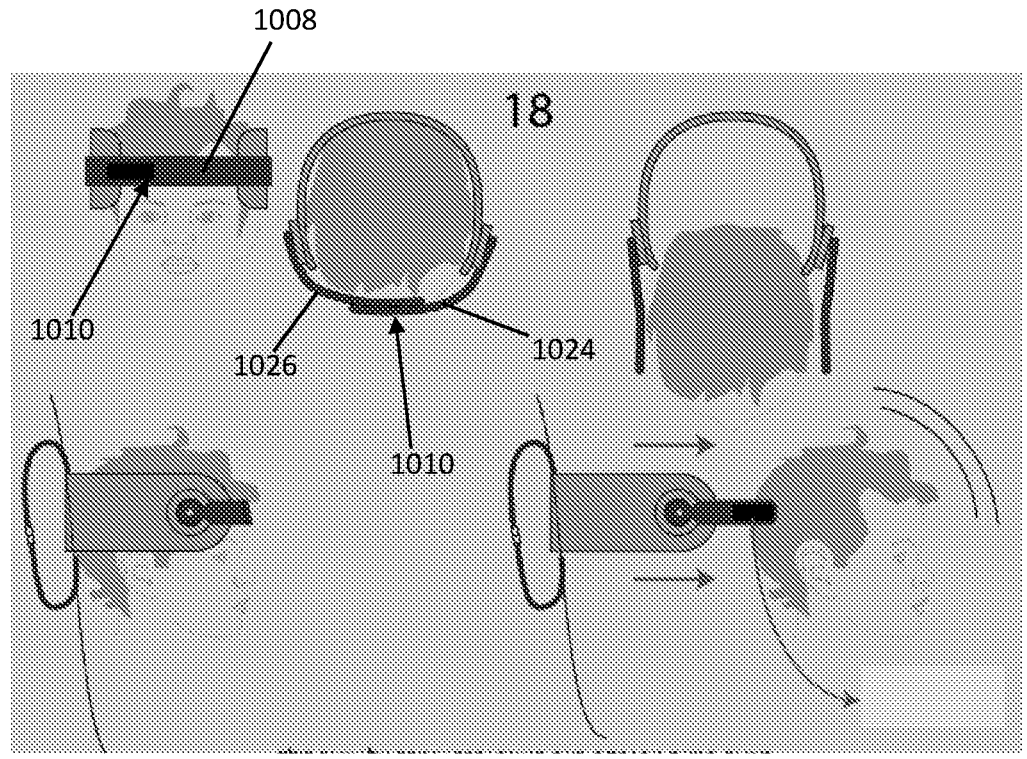
FIG. 10 is a schematic illustration exemplifying a non-limiting realization of the loop breaking mechanism.

FIG. 10 shows a retaining mechanism 1010 in the form of Velcro type coupling between two parts 1024 and 1026 of the head restraining member 1008. The two parts are attached one to another via the Velcro coupling and are configured to be detached upon application of a tension force that is greater than a certain threshold.

Figure 11:
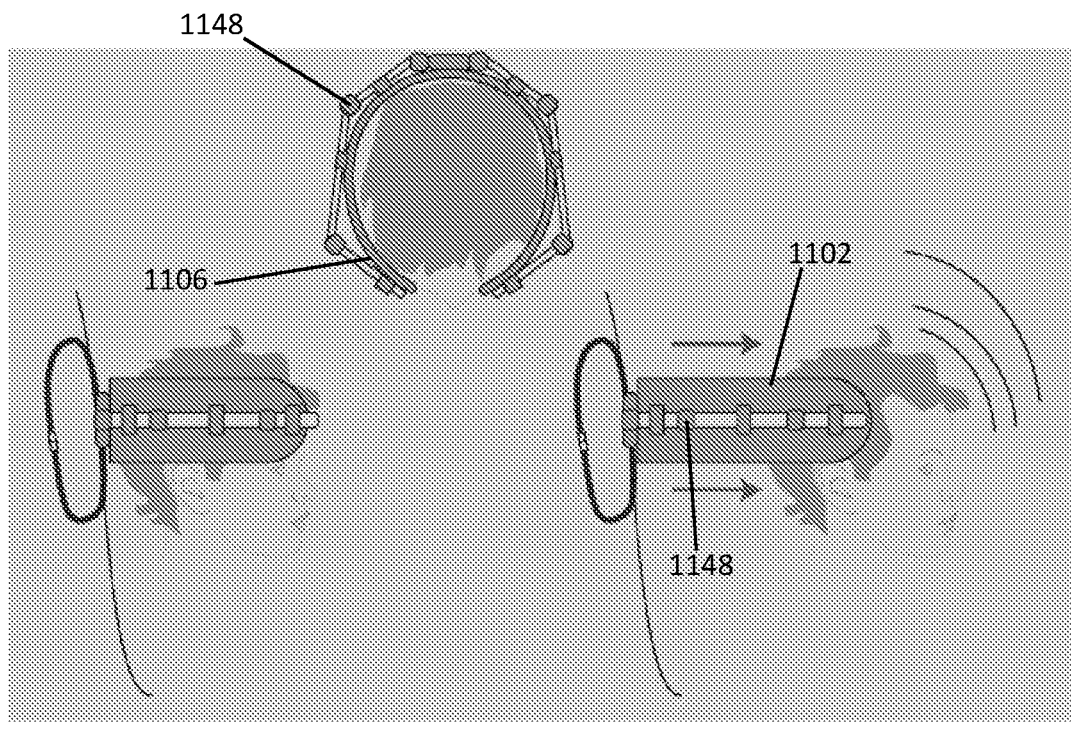
FIG. 11 is a schematic illustration exemplifying a non-limiting realization of a state transition mechanism of the side portions between a forehead restraining state and a non-forehead restraining state, according to an aspect of the present disclosure.

FIG. 11 shows an example of a state transition mechanism of the side portions between a forehead restraining state and a non-forehead restraining state, according to an aspect of the present disclosure. The headrest member 1102 is associated with a joints-formation 1148 that is capable of transforming its state between a forehead restraining state and a non-forehead restraining state upon application of force thereon, which results in a respective transition of state of the side portions 1106.

Figure 12:
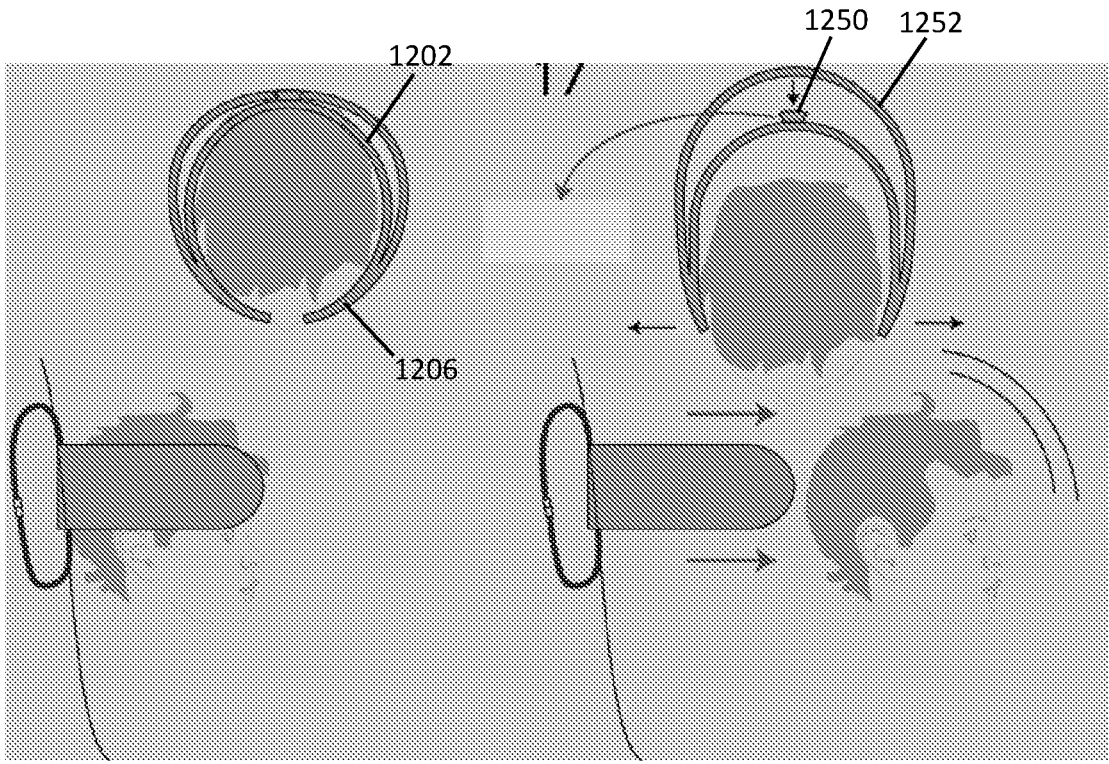
FIG. 12 is a schematic illustration exemplifying a non-limiting realization of a state transition mechanism of the side portions between a forehead restraining state and a non-forehead restraining state, according to an aspect of the present disclosure.

FIG. 12 shows an example of a state transition mechanism of the side portions between a forehead restraining state and a non-forehead restraining state, according to an aspect of the present disclosure. The headrest member 1202 comprises a rear coupling element 1250 configured to be coupled to an external embracing element 1252 and upon coupling thereto the side portions 1206 are transitioned to a forehead restraining state and when it is decoupled therefrom the side portions 1206 are in a non-forehead restraining state.

Figure 13A:
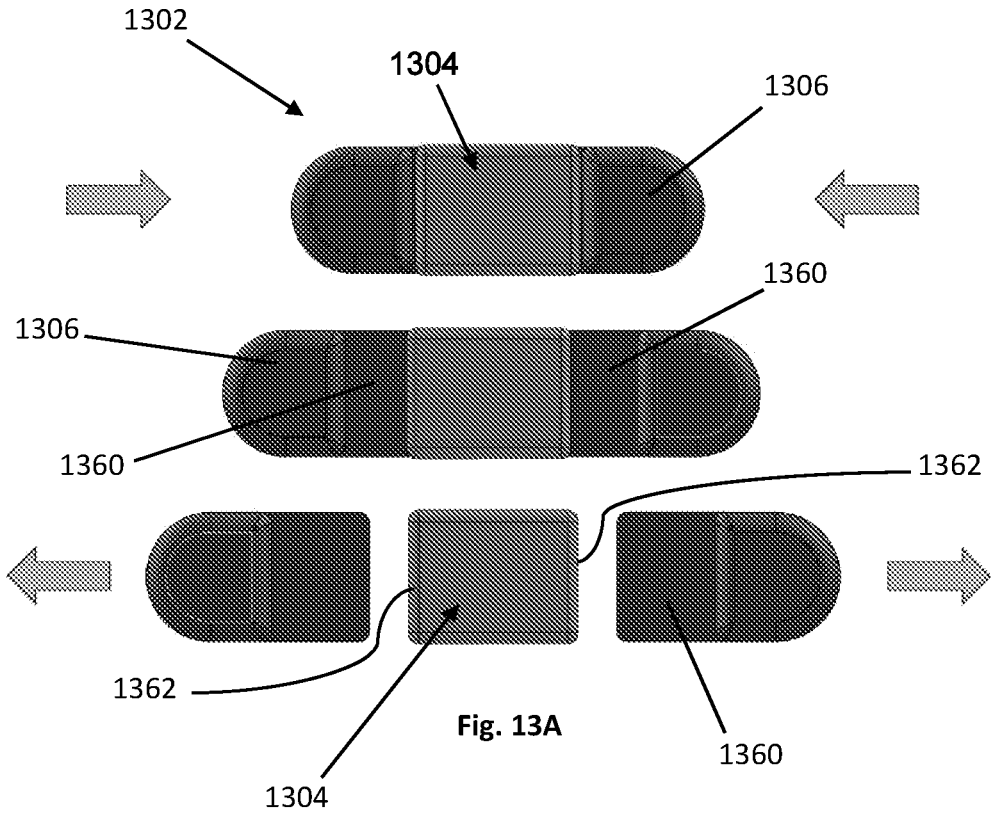
FIGS. 13A-13B are schematic illustrations of a non-limiting example of a headrest member length-adjusting arrangement of the headrest member.
Figure 13B:
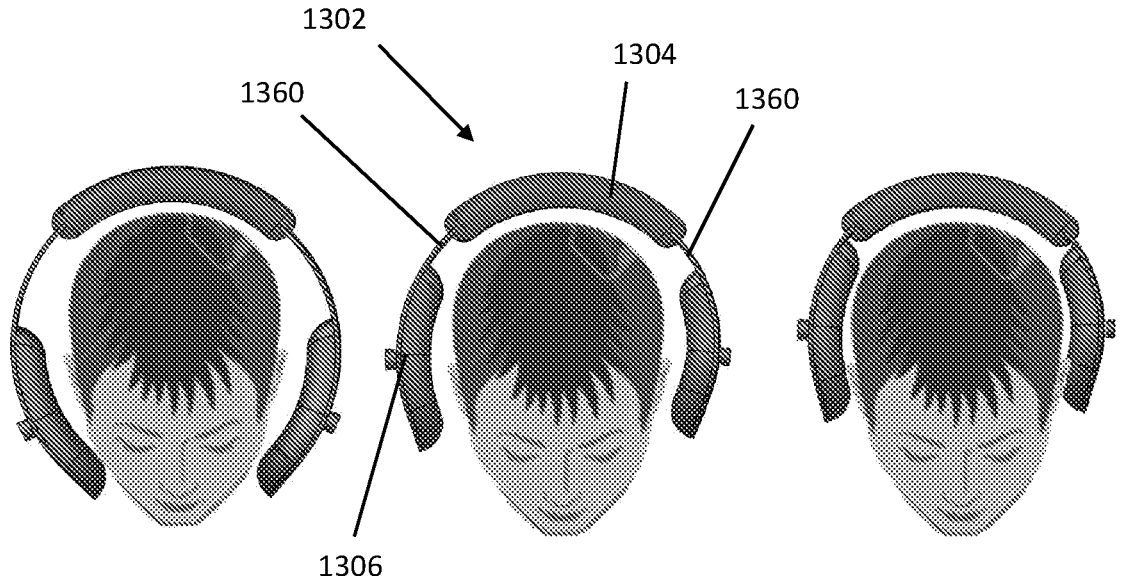

FIGS. 13A-13B are schematic illustrations of an example of length adjusting arrangement of the headrest member so as to allow fitting over a range of head sizes or suitable for different types of protections. Each figured shows three different length states of the headrest member 1302. Each of the side portions 1306 has a tab 1360 that is received within a pocket 1362 formed in the back portion 1304. The tab 1360 can be inserted into the pocket 1362 along a range of states, between a maximal state, in which the entire tab is received in the pocket 1362 and a minimal state, in which the maximal length of the tab is external to the pocket 1362. Typically, the two tabs 1360 are linked to perform a symmetric movement such that the lengths of the side portions 1306 are equal. However, in some embodiments, each tab 1306 can be adjusted independently to the other.

Figure 14A:
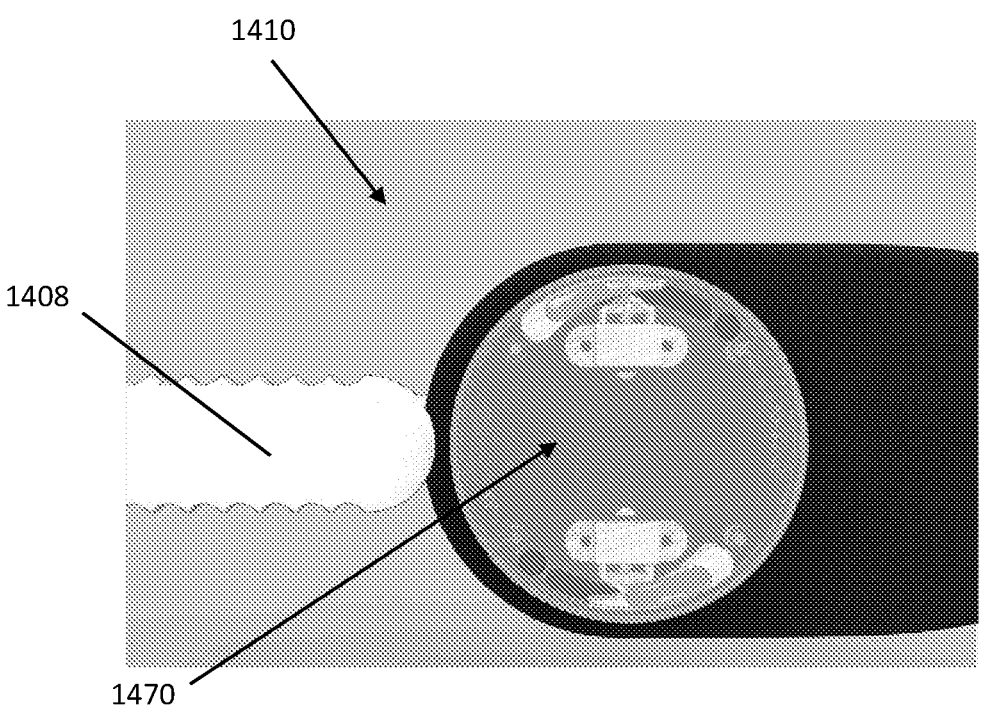
FIGS. 14A-14C are schematic illustrations of different states of a non-limiting example of a releasing force adjusting unit.
Figure 14B:
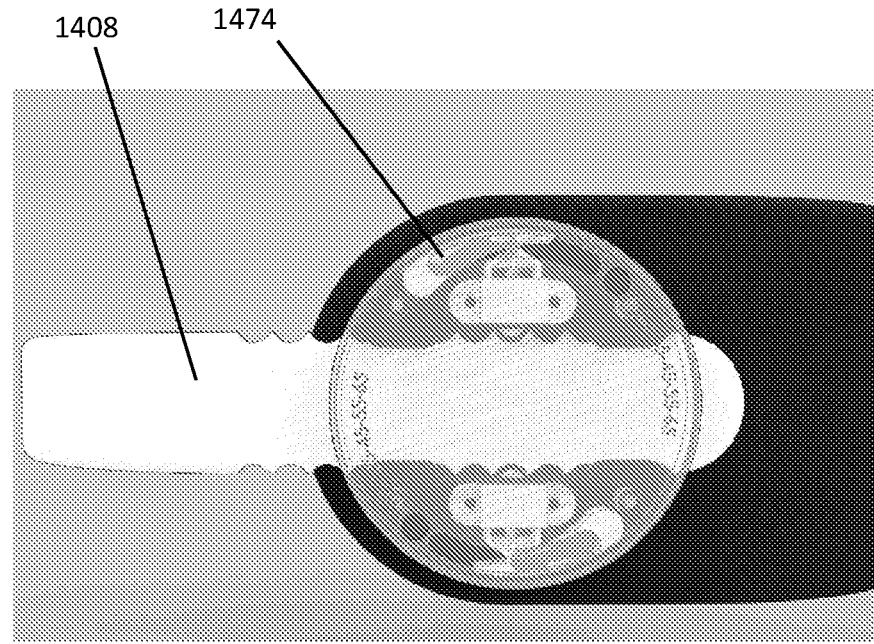
Figure 14C:
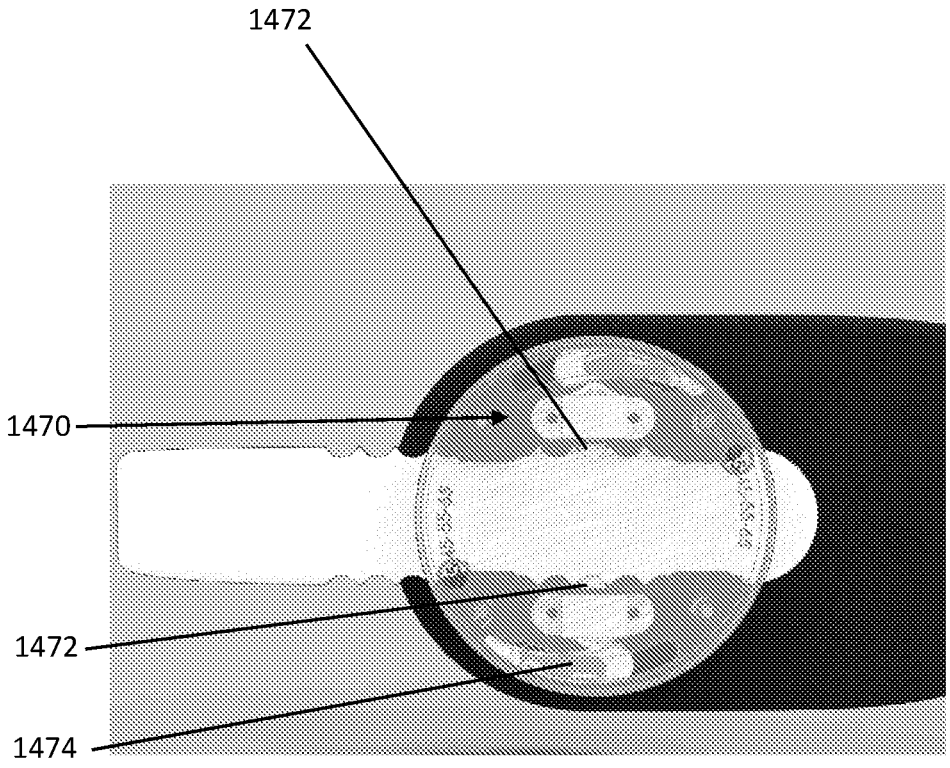

FIGS. 14A-14C are schematic illustrations of different states of a non-limiting example of a releasing force adjusting unit. In this example, the retaining mechanism 1410 comprises a releasing force adjusting unit 1470 that allows to controllably adjust the retaining force of the retaining mechanism 1410, thereby affecting the releasing force, The restraining member 1408 is received within an internal space of the retaining mechanism 1410 and is slid until reaching a position that defined the desired effective length, namely a length that fits to the head size of the user (as can be seen in FIG. 14B). Once in the desired position, the retaining mechanism 1410 is switched to a state in which it retains the restraining member 1408 in a desired force, as can be seen in FIG. 14C. In this example, the switching between the states is performed by a rotational movement of the retaining mechanism 1410 and the releasing force adjusting unit 1470. The releasing force adjusting unit 1470 provides the capability to select several degrees of releasing force. The releasing force increases by pressing with a greater force on a plunger 1472 that engages the restraining member 1408. In this specific and non-limiting example, the increase in the pressing force of the plunger results due to the increase of the size of a pressing member 1474 of the releasing force adjusting unit 1470 in the rotational movement. Namely, rotating the releasing force adjusting unit 1470 in a certain direction, causes the plunger to engage with a portion of the pressing member 1474 that gradually increases, resulting in a greater force application on the restraining member 1408.

Figure 15:
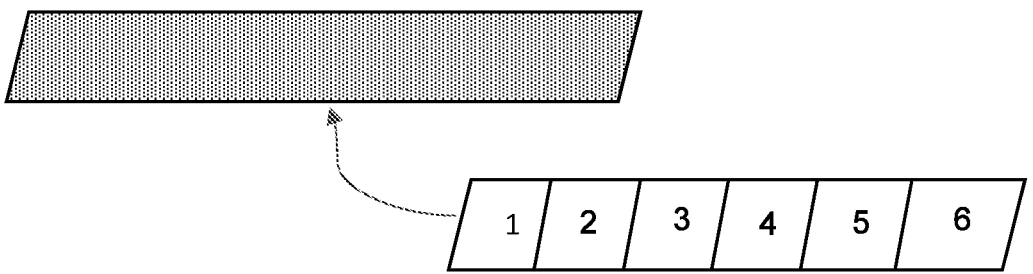
FIG. 15 is a schematic illustration of another non-limiting example of a releasing force adjusting unit.

FIG. 15 is a schematic illustration of another non-limiting example of a releasing force adjusting unit. This example provides a solution based on the length attachment between two straps. The longer the attachment between the two straps, the greater the release force. In this example, there are 6 degrees of release forces that can be selected, for each degree a length that is required for the attachment is marked. The attachment between the two straps can be made based on a hook and loop fastener or any other attachment solution known in the art. It is to be noted that the attachment length defining the release force may be independent to the length adjustment of the restraining member. In case the attachment length defining the release force affects the effective length of the restraining member, the head restraint unit comprise a compensation length adjusting unit to allow compensation of the length of the restraining member. This can also be done by adjusting the length of the headrest member.

The invention claimed is:

1. A head restraint unit comprising:
   a headrest member configured for being fixed to a seat and having a back portion and a first side portion and a second side portion extending therefrom;
   a restraining member formed by one or more parts and pivotally coupled to said first and second side portions so as to allow rotation between a head-restraining position and a standby position of said one or more parts, wherein:
      said headrest member and said one or more parts define together a head restraining loop; and
      a path defined by the back portion, side portions and the head restraining member defines a loop directionality;
   at least one retaining mechanism configured for:
      (i) retaining one or more portions of said restraining member for preventing its movement along the loop directionality; and
      (ii) releasing said one or more retained portions upon either (a) exceeding of application of a selected releasing tension force on said one or more retained portions to transition to a non-restraining state, (b) identification of extreme maneuver by sensors in the vehicle that are in data communication with the retaining mechanism, (c) or actuation of a releasing mechanism thereof; and
   a loop breaking mechanism configured for breaking the loop open upon exceeding of application of a selected force thereon or identification of extreme maneuver by sensors in the vehicle that are in data communication with the loop breaking mechanism, wherein:
      said loop breaking mechanism is constituted by said retaining mechanism; and
      said retaining mechanism comprises releasing force adjusting unit configured for allowing adjustment of said releasing force.

2. The head restraint unit of claim 1, wherein:
   the retaining mechanism is rotatable about an axis normal to the plane defined by the side portion and is configured for retaining a portion of the restraining member to thereby allow said pivotally coupling to said first side portion; and
   the restraint unit further comprises first and second retaining mechanisms, each being configured for retaining a portion of the restraining member for preventing its movement along the restraining member directionality, and performing said pivotally coupling to said first and second side portions, respectively.

3. The head restraint unit of claim 2, wherein the retaining mechanism comprises (i) fixation member fixed to said side portion and (ii) a retention member pivotally coupled to said fixation member for allowing said retaining and said rotation.

4. The head restraint unit of claim 1, wherein:
   the restraining member is constituted by a first part that is pivotally coupled to said first side portion and a second part that is pivotally coupled to said second side portion, and

the retaining mechanism is formed on said first part and is configured for retaining a portion of the second part such that the second part remains in position with respect to the first part.

5. The head restraint unit of claim 4, wherein:
the first part is longer than the second part; and
the second part comprises a coupling band formed on external face thereof configured for being received in said retaining mechanism and being retained therein.

6. The head restraint unit of claim 4, wherein said retaining mechanism is either a hook-and-loop fastener or constituted by seams formation coupling the first part to the second part.

7. The head restraint unit of claim 1, wherein said retaining mechanism comprises (i) a ratchet mechanism for performing said retaining and (ii) a controllable releasing mechanism for controllably releasing said retained portion upon actuating it.

8. The head restraint unit of claim 1, wherein:
said retaining mechanism comprises a receiving space for receiving said retained portion of said restraining member, and
first and second engaging elements protrude from opposite sides into said receiving space, each being configured to engage an opposite side of the restraining member when being received in said receiving space.

9. The head restraint unit of claim 8, wherein:
said first engaging element is fixed and said second engaging element is gradually displaceable between maximal engagement position and minimal engagement position, thereby defining the restraining intensity of said restraining member; and
a portion of said first engaging element in said receiving space has a curved, round, or convex shape.

10. The head restraint unit of claim 1, wherein said retaining mechanism comprises a tooth-engaging element configured for engaging with a respective toothed part in said retained portion.

11. The head restraint unit of claim 1, wherein said retained portion is snappingly fit in said retaining mechanism to thereby be retained therein.

12. The head restraint unit of claim 1, wherein said retaining mechanism comprises:
(i) a receiving space for receiving said retained portion of said restraining member; and
(ii) a fastening element gradually transitionable between a maximal fastening state, in which it applies maximal force on said retained portion when being receive in the receiving space, and a minimal fastening state, in which it applies minimal force on said retained portion when being receive in the receiving space.

13. The head restraint unit of claim 1, wherein said retaining mechanism comprises an electric locking mechanism that is configured to execute a release command to release said retained portion upon either (i) actuating a release actuator or (ii) sensing or receiving execution data indicative of said exceeding of application of a selected releasing force on said portion.

14

14. The head restraint unit of claim 1, wherein said restraining member is a strap or a band.

15. The head restraint unit of claim 1, wherein:
the headrest member comprises a headrest length-adjusting arrangement for adjusting the length of the headrest member;
each side portion comprises an end being received in a receiving portion of the back portion, each end being capable of extraction and retraction from said receiving portion along a range defined between a maximal extraction position and a maximal retraction position and to be arrested in one or more positions along said range; and
the two ends of the side portions are configured to perform a symmetrical movement.

16. The head restraint unit of claim 1, wherein the headrest member comprises a fixing element for fixing it to a seat.

17. The head restraint unit of claim 1, being integral with a seat.

18. A seat comprising a head restraint unit of claim 1.

19. A head restraint unit comprising:
a headrest member having a back portion and first and second side portions extending therefrom;
a restraining member formed by one or more parts and pivotally coupled to said first and second side portions so as to allow rotation between a head-restraining position and a standby position of said one or more parts, said restraining member extends between two ends and defining a restraining member directionality; and
at least one retaining mechanism characterized by either (i) being formed on one or both of said side portions and configured for retaining one or more portions of the restraining member for preventing its movement along the restraining member directionality, and to perform said pivotally coupling to said first side portion, or (ii) when the restraining member is constituted by a first part that is pivotally coupled to said first side portion and a second part that is pivotally coupled to said second side portion, the retaining mechanism is formed on said first part and is configured for retaining a portion of the second part such that the second part remains in position with respect to the first part;
wherein:
said retaining mechanism is configured for releasing the retained portion upon exceeding of application of a selected releasing force on said portion; and
said retaining mechanism comprises releasing force adjusting unit configured for allowing adjustment of said releasing force.

20. The head restraint unit of claim 19, wherein said restraining member is formed of two parts, the retaining mechanism is a spring embedded in each part being configured to transition between a restraining state and a non-restraining state upon said application of a selected releasing force.

* * * * *